(12) United States Patent
Kelsch

(10) Patent No.: US 7,419,045 B2
(45) Date of Patent: Sep. 2, 2008

(54) APPARATUS AND METHOD FOR IMPROVING PACKAGING FLOW

(75) Inventor: Jeffery Kelsch, Waymart, PA (US)

(73) Assignee: Cinram International Inc., Scarborough (CA)

( * ) Notice: Subject to any disclaimer, the term of this patent is extended or adjusted under 35 U.S.C. 154(b) by 244 days.

(21) Appl. No.: 11/197,904

(22) Filed: Aug. 5, 2005

(65) Prior Publication Data

US 2007/0029167 A1    Feb. 8, 2007

(51) Int. Cl.
*B65G 47/26* (2006.01)
(52) U.S. Cl. .............................. 198/459.6; 198/781.01
(58) Field of Classification Search ............... 198/459.6, 198/459.7, 781.01–781.11
See application file for complete search history.

(56) References Cited

U.S. PATENT DOCUMENTS

| | | | | |
|---|---|---|---|---|
| 3,696,912 | A * | 10/1972 | Fleischauer et al. ...... | 198/781.1 |
| 3,724,642 | A * | 4/1973 | De Good ............... | 198/781.06 |
| 3,730,330 | A * | 5/1973 | De Good ............... | 198/781.09 |
| 3,760,932 | A * | 9/1973 | Schneider .............. | 198/781.09 |
| 3,768,630 | A * | 10/1973 | Inwood et al. ......... | 198/781.06 |
| 4,219,115 | A * | 8/1980 | Moore .................... | 198/781.06 |
| 4,362,238 | A * | 12/1982 | Rivette ..................... | 198/781.1 |
| 4,562,920 | A * | 1/1986 | Jaffre ..................... | 198/781.08 |
| 4,838,920 | A | 6/1989 | Blasquez-Gonales et al. | |
| 5,016,748 | A * | 5/1991 | Garzelloni ............. | 198/781.09 |
| 5,121,892 | A | 6/1992 | Herzog | |
| 5,131,937 | A | 7/1992 | Kuster et al. | |
| 5,141,096 | A | 8/1992 | Strasser et al. | |
| 5,211,276 | A * | 5/1993 | Clopton ................... | 198/345.3 |
| 5,348,139 | A * | 9/1994 | Szarkowski et al. .... | 198/781.05 |
| 5,546,734 | A | 8/1996 | Moncrief et al. | |
| 5,806,661 | A * | 9/1998 | Martin et al. ......... | 198/781.06 |
| 5,823,319 | A * | 10/1998 | Resnick et al. ........ | 198/781.06 |
| 6,220,418 | B1 * | 4/2001 | Moradians ................ | 193/35 A |
| 6,374,997 | B1 | 4/2002 | Spadafora et al. | |
| 6,422,378 | B1 * | 7/2002 | Allgaier ................. | 198/781.03 |
| 6,557,320 | B2 | 5/2003 | Chang et al. | |
| 6,594,969 | B2 | 7/2003 | Laroche | |
| 6,763,930 | B2 * | 7/2004 | Johnson et al. ......... | 198/459.6 |
| 6,823,648 | B2 | 11/2004 | Holter | |
| 6,959,804 | B2 * | 11/2005 | Helgerson et al. .......... | 198/805 |
| 2003/0093978 | A1 | 5/2003 | Holter | |
| 2005/0103657 | A1 | 5/2005 | Siecke et al. | |
| 2006/0023598 | A1 | 2/2006 | Babinski et al. | |
| 2006/0101634 | A1 | 5/2006 | Sweeney | |
| 2006/0104190 | A1 | 5/2006 | Babinski | |
| 2006/0165419 | A1 | 7/2006 | Musto | |
| 2006/0181706 | A1 | 8/2006 | Sweeney | |
| 2006/0222808 | A1 | 10/2006 | Pickutoski et al. | |

(Continued)

OTHER PUBLICATIONS

U.S. Appl. No. 11/705,682, filed Feb. 13, 2007.
U.S. Appl. No. 11/715,249, filed Mar. 6, 2007.
U.S. Appl. No. 11/726,968, filed Mar. 22, 2007.

*Primary Examiner*—Mark A Deuble
(74) *Attorney, Agent, or Firm*—Cooper & Dunham, LLP

(57) ABSTRACT

An outfeed rail is provided. The outfeed rail assembly includes a rail arm and a pivoting abutment including a support arm attached to the rail arm and a pivoting abutment attached to the support arm. A first article is transported via a conveyor until it reaches the outfeed rail assembly. The first article moves along the roller until its momentum is stopped by the pivoting abutment. The first article rests at a stopped position until it is displaced from the stopped position by another article sent down the conveyor.

18 Claims, 4 Drawing Sheets

U.S. PATENT DOCUMENTS

| | | |
|---|---|---|
| 2006/0270080 A1 | 11/2006 | Rinaldi |
| 2006/0274617 A1 | 12/2006 | Musto et al. |
| 2007/0008861 A1 | 1/2007 | Fumanti |
| 2007/0014224 A1 | 1/2007 | Sweeney |
| 2007/0090006 A1 | 4/2007 | Kelsch |
| 2007/0098947 A1 | 5/2007 | Mueller |

* cited by examiner

APPARATUS AND METHOD FOR IMPROVING PACKAGING FLOW

TECHNICAL FIELD

This application relates to flow of items along a production line, and more specifically to improved techniques for controlling transport of items along a production line.

DESCRIPTION OF RELATED ART

Techniques for transporting articles along a manufacturing line or production line (for example, utilizing conveyors) are known in the art. Efficient operations without jamming and damage to articles during transport along the production line are typically desired.

For example, manufacturing of optical discs is typically automated, and the optical discs are generally assembled along with inserts of printed material (for example, a booklet, other text, graphics, etc.) into individual cases (such as clamshell-type cases, referred to as "jewel cases"), boxes, containers or the like, in an assembly area of the production line. In addition, labels, security devices, shrink wrap, etc., are typically applied to optical disc cases, in a packaging area of the production line. In many instances, an automated device is used for applying the labels, security devices, shrink wrap, etc., and it generally requires that the optical disc package be situated in a predetermined orientation when the label or the like is being applied.

On the other hand, when optical disc packages proceed along a production line in an uncontrolled manner, or at other than the desired speed and/or orientation, such packages can cause blockage and/or jamming in the line, thereby hindering movement of subsequent optical discs along the production line. In addition, a package may be damaged if it is misfed or it otherwise jams along the production line. These problems can occur in conventional production lines when (or just before) the packages reach the label applying device (or the like).

Optical disc packages are transported along a production line conventionally without (or with insufficient) means for controlling the speed and/or orientation with which the optical disc packages enter the packaging area where labels, security devices, shrink wrap, etc., are applied. Since conventional production lines typically do not provide sufficient means for correcting the orientation of the packages, jamming is often experienced in the production line, particularly at a point of transition from one area of a production line, which requires one package orientation, to another area of the production line which requires a different package orientation.

There is a need for reliable and inexpensive techniques for controlling the orientation and speed of an article traveling along a production line, such as at a point of transition from one area of the production line, which requires one orientation of the article, to another area of the production line which requires a different orientation of the article.

SUMMARY

This application provides an outfeed rail assembly which enables smooth transport along a production line, such as at a point of transition from one area of the production line, which requires one package orientation, to another area of the production line which requires a different package orientation.

An outfeed rail assembly, according to an exemplary embodiment of the present application, includes a rail arm and a pivoting abutment assembly including a support arm attached to the rail arm and a pivoting abutment arm pivotally attached to the support arm.

According to another exemplary embodiment, an outfeed rail assembly includes a rail arm, a guide rail attached to the rail arm, at least one roller attached to the rail arm and aligned in the same horizontal plane as the guide rail, a support arm attached to the rail arm, and a pivoting abutment attached to the support arm. The pivoting abutment may further include a pivoting abutment arm, at least one roller attached to the pivoting abutment arm, a spring, and, means for adjusting the degree of movement of the pivoting abutment arm and the spring.

In another exemplary embodiment, an outfeed rail assembly includes a rail arm, a support arm attached to the rail arm, and a spring-loaded lever pivotally attached to the support arm.

This application also provides improved techniques for transporting an article along a production line.

According to an exemplary embodiment, a method for transporting an article along a production line includes transporting a first article via a conveyor mechanism to an outfeed rail assembly, stopping at a stopping position the momentum of the first article with a pivoting abutment of the outfeed rail assembly, and releasing the first article from the stopped position when the first article at the stopping position is displaced by a member of the conveyor or by another article on the conveyor.

In another exemplary embodiment, a method for transporting an article between first and second areas of a production line and, includes transporting a first article to an outfeed rail by utilizing a conveyor mechanism, stopping at a stopping position a momentum of the first article by utilizing a spring-loaded lever pivotally attached to a support arm of the outfeed rail, and releasing the first article from the stopped position when another article sent via the conveyor displaces the first article at the stopping position.

BRIEF DESCRIPTION OF THE DRAWINGS

The features of the present application can be more readily understood from the following detailed description with reference to the accompanying drawings wherein.

DETAILED DESCRIPTION

As discussed supra, it is generally desirable to control the orientation and speed of an article being transported along a production line, such as at a point of transition from one area of the production line, which requires one orientation of the article, to another area of the production line which requires a different orientation of the article. In many instances, the other area performs processing of an article which requires reorienting the article. In order to perform the reorientation, the article generally must enter the area in a predetermined orientation. An outfeed rail can be provided as an interface for maintaining control of the orientation and/or speed of an article as it makes the transition from one area of the production line to another area of the production line.

Some exemplary embodiments for an optical disc production line are discussed below. However, it should be appreciated that the subject matter of this application is not limited to optical disc production and can be applied to facilitate controlled transport of other articles along a production line. Also, it should be appreciated that although the terms "manufacturing line" and "production line" are used herein, the manufacturing or production "line" does not need to be configured in-line (that is, in a straight line), and can be configured in a L-shape or a more complex configuration.

Figure 1A:
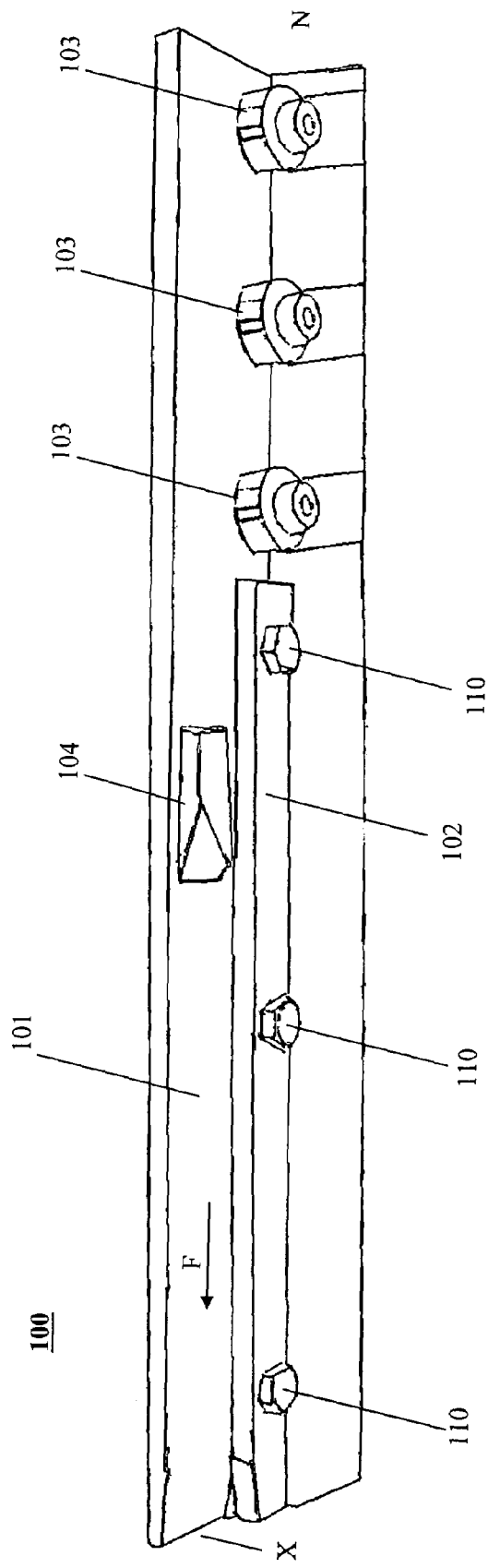
FIG. 1A shows a perspective view of an outfeed rail assembly.

An outfeed rail assembly 100 is shown in FIG. 1A. The outfeed rail assembly 100 includes a rail arm 101, a guide rail 102 secured to the rail arm 101 by fasteners 110, rollers 103 coupled to the rail arm 101, and a metal (for example, aluminum) tab 104 with a leaf spring (not shown) applied to a back surface thereof. It should be apparent that the outfeed rail assembly 100 is one half of the outfeed rail, with the other half being a mirror image assembly facing the near side (in FIG. 1A) of the outfeed rail assembly 100.

Figure 1B:
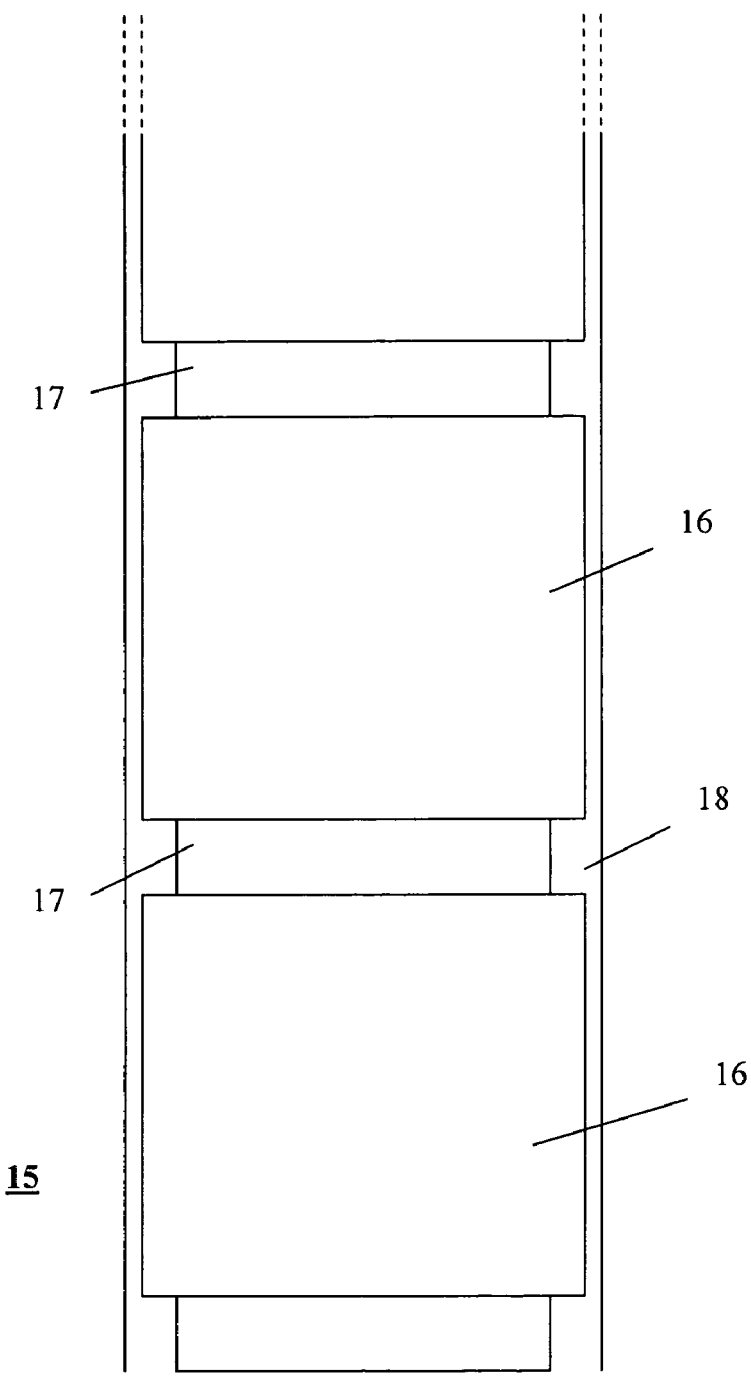
FIG. 1B shows a plan view of a portion of a conveyor mechanism along a production line, for feeding optical disc packages in a controlled manner to an outfeed rail.

The outfeed rail assembly can be connected to a conveyor mechanism (such as shown in part in FIG. 1B), and serve as an interface between the conveyor mechanism and the next stage in a production line. Cases 16 containing optical discs are positioned on a conveyor belt 18 of a conveyor mechanism 15 separated by spacers 17.

When the outfeed-rail is connected to the conveyor mechanism 15, the conveyor mechanism 15 transports an optical disc case to the outfeed rail 100. A force is applied to the optical disc case in a forward direction F by the conveyor mechanism via the spacer trailing the case, to cause the case to ride up onto the rollers 103 of the outfeed rail. The optical disc case slides along the outfeed rail, with the help of the rollers 103, to a stop position where the case abuts the metal tab 104. While the optical disc case abuts the metal tab 104, the case sits fully on the outfeed rail and is not contacted by the spacer 17, and the forward force is no longer applied to the case.

The metal tab 104 in combination with the leaf spring, which exerts a spring force on the metal tab, holds the case in a holding position until a sufficient force is applied to the case from behind by a second optical disc case. The metal tab 104 is depressed in a direction towards the leaf spring when sufficient force is applied to a front surface of the metal tab.

The outfeed rail assembly 100 has a drawback in that the metal tab and and/or the leaf spring loses its holding action with repeated use (and/or over time) and often needs to be replaced. When the holding action is lost, the case slides over the outfeed rail unimpeded, into the next stage of the production line. Under such circumstances, the case in many instances rides off the outfeed rail in an uncontrolled orientation which can cause blockage in the next stage of the production line, requiring operator intervention to clear the blockage, and thereby causing production downtime and decreased throughput.

Figure 2A:
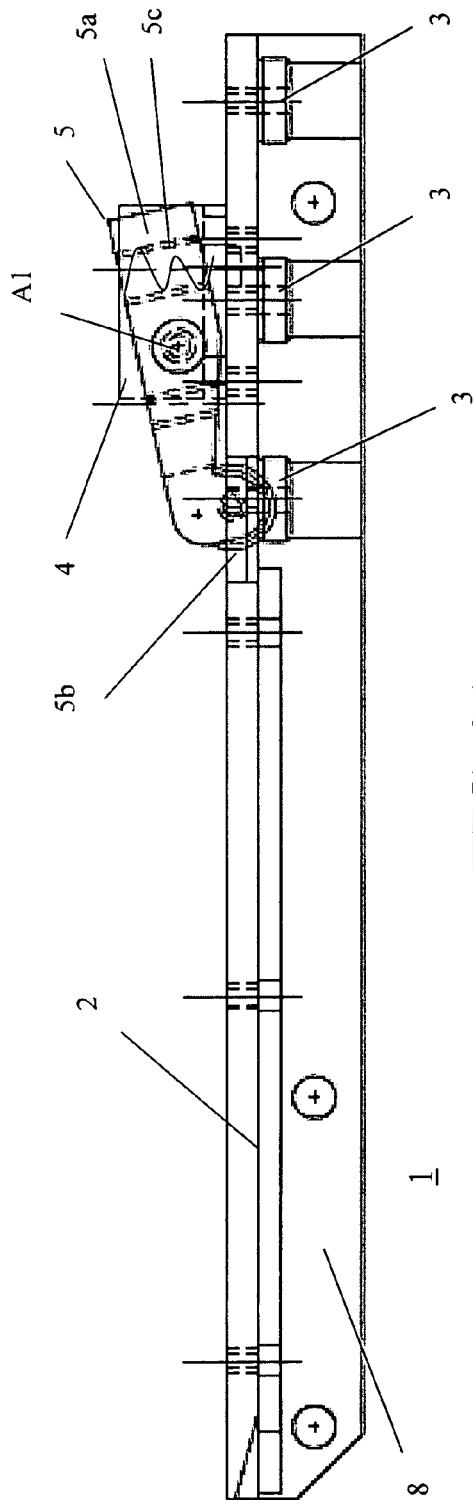
FIGS. 2A and 2B show side and top schematic plan views, respectively, of an outfeed rail assembly, in accordance with an embodiment of the present application.
Figure 2B:
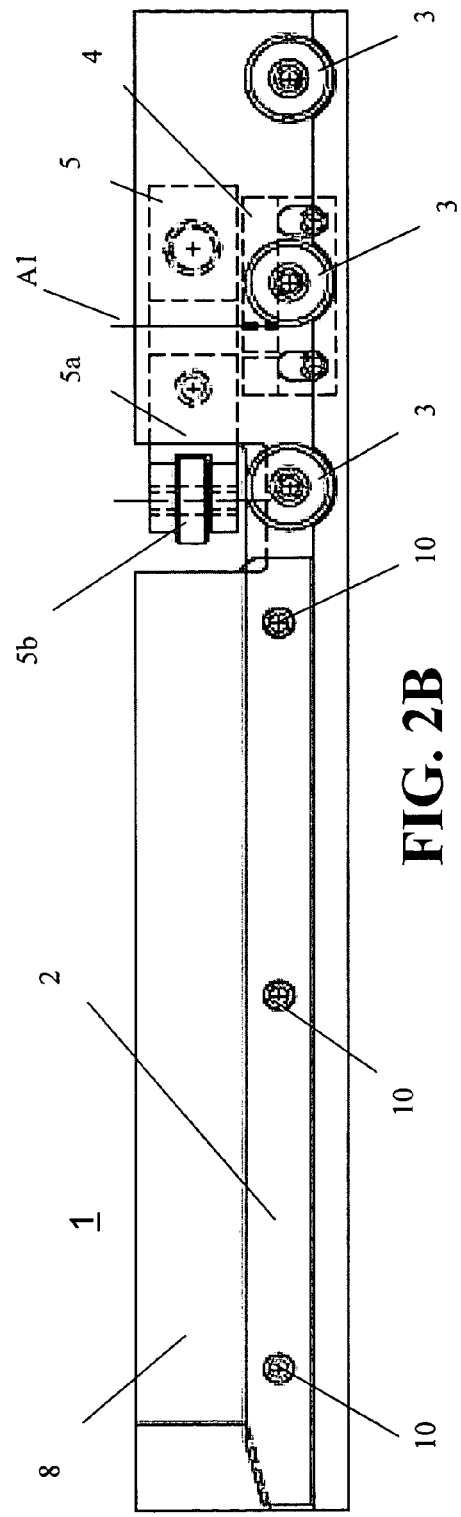
Figure 3:
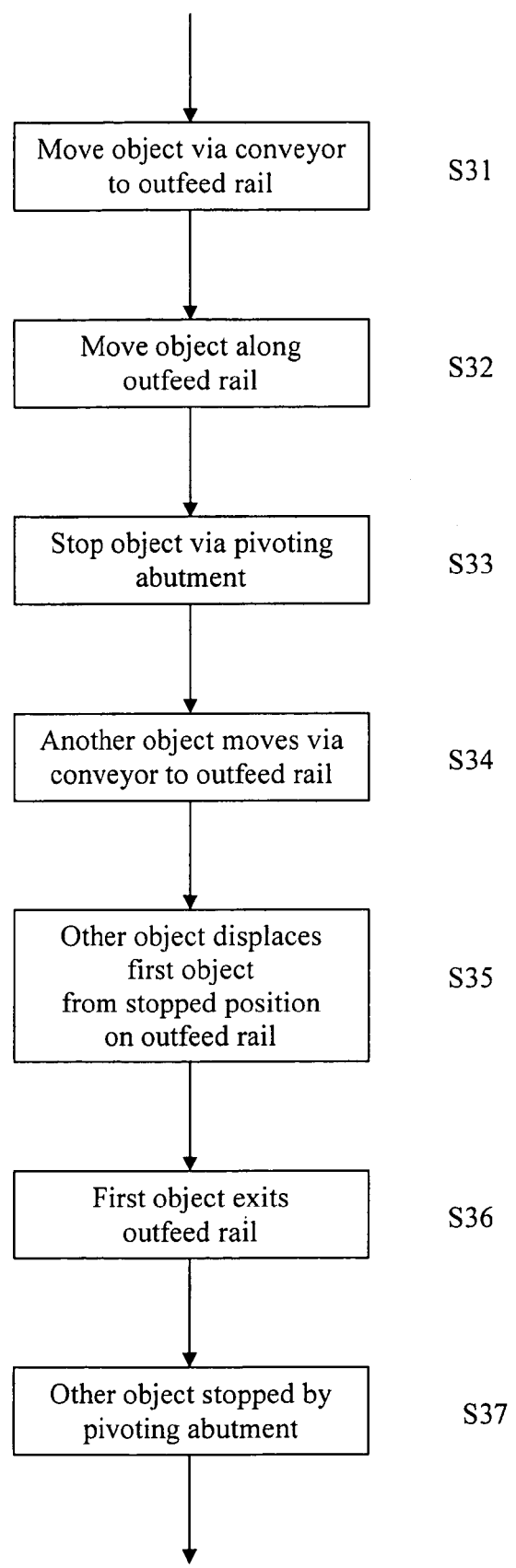
FIG. 3 shows a flow chart for a method for transporting an article using a conveyor mechanism, in accordance with an embodiment of the present application.

An improved outfeed rail assembly is shown in FIGS. 2A and 2B. Outfeed rail assembly 1 preferably comprises rail arm 8, guide rail 2, roller 3, pivoting abutment assembly 5, and fasteners 10.

The rail arm 8, similar to the rail arm 101 of FIG. 1A, supports other elements of the outfeed rail assembly and may be attached directly to the conveyor mechanism 15.

The guide rail 2 is similar to the guide rail 102 of FIG. 1A, and is attached to the rail arm 8 by the fasteners 10. As one skilled in the art should appreciate, fastener 10 may be any conventional fastener but is preferably a threaded fastener that prevents movement upon tightening. The guide rail 2 guides an optical disc case 11 along rail arm 8 until the case exits the outfeed rail assembly.

The rollers 3 are attached to the rail arm 8 and maintain the momentum of the case as it slides onto the outfeed rail assembly. The roller 3 is preferably a conventional bearing with an inner race and an outer race rotatably secured together by conventional bearing means that allow for smooth and efficient movement. The roller 3 can be attached to the rail arm 8 by a conventional washer and threaded fastener combination wherein the threaded fastener is threadably secured through the inner race of roller 3, and by which the roller 3 is secured to rail arm 8 while allowing movement when desired.

The pivoting abutment assembly 5 can operate as a spring-loaded lever, and stop the momentum of the optical disc case as the case travels along the outfeed rail 1 and hold the case in the stopped position. The pivoting abutment assembly 5 releases the case when sufficient force is applied to the case in a forwardly direction which translates to a corresponding tangential force against the pivoting abutment 5, to cause the pivoting abutment 5 to pivot from the holding position to a retracted position.

In a preferred embodiment, the pivoting abutment assembly 5 comprises a pivoting abutment arm 5a, a roller 5b attached to the pivoting abutment arm 5a, a spring 5c, a support arm 5d, and means (not shown) for adjusting the degree of movement of the pivoting abutment arm 5a.

The support arm 5d is attached to the rail arm 8 through a conventional fastener, and connects the pivoting abutment assembly 5 to the rail arm 8.

The pivoting abutment arm 5a is pivotally attached to the support arm 5d, and can pivot about axis Al. The pivoting action is discussed below.

The roller 5b is preferably a conventional bearing with an inner race and an outer race rotatably secured together by conventional bearing means which allows for smooth and efficient movement. The roller 5b is attached to the pivoting abutment arm 5a by a conventional threaded fastener wherein the threaded fastener is threadably secured through the inner race of the roller 5b, while allowing rotational movement of the roller when desired.

As one skilled in the art should appreciate, the spring 5c has an associated stiffness. While the stiffness of the spring may vary depending upon the requirements of the outfeed rail assembly, it is typically chosen to balance between, on the one hand, enabling the pivoting abutment arm 5a to be in a holding position for holding a case 11 in place in a stopped position when the only force propelling the case 11 is its momentum as it travels over the rollers 3, and on the other hand, enabling the pivoting abutment arm 5a to swing to a release position when a sufficient tangential force is applied against the roller 5b by the case 11 when the case 11 is driven by a second case (from behind the case 11) propelled by the conveying mechanism 15.

The means for adjusting the degree of movement of the pivoting abutment arm 5a is preferably a screw whose length may be adjusted to increase or decrease the degree which the pivoting abutment arm 5a moves from a holding position to a release position.

The pivoting abutment arm 5a is held in a holding position when the spring 5c is in a decompressed position. When the pivoting abutment arm 5a is held in a holding position, the roller 5b is positioned at such an angle that it does not allow rotation thereof and holds a case in place in a stopped position. When a sufficient tangential force is applied against the roller 5b by the case when the case is driven by a second case (from behind the case) propelled by the conveying mechanism 15, the roller 5b transfers the tangential force to the pivoting abutment arm 5a which then swings to a release position about axis A1 and compresses the spring 5c. The roller 5b is now at such an angle that it allows for rotational movement, and the case is released from a stopped position and glides along roller 5b to guide rail 2. When the force is no longer applied to the roller 5b, the spring 5c decompresses causing the pivoting abutment arm 5a to swing about axis A1 back to a holding position.

In a preferred embodiment, the rail arm 8 is L-shaped. The spacing between the roller 3 and the roller 5b can be adapted to accommodate cases and packages of assorted sizes.

The outfeed rail assembly can be made of any suitable material, including metal (for example, aluminum, steel, another metal, alloy, etc.), plastic, wood, ceramic and composites.

A method for transporting an object from a source position to an outfeed position is discussed below with reference to FIGS. 1B, 2A, 2B and 3. An optical disc case 11 is transported via the conveyor mechanism 15 until it reaches the outfeed rail 1 (step S31). The spacers 13 keep the cases separated and equally spaced. The case 11 then moves onto the outfeed rail and over the rollers 3 until its momentum is stopped by the pivoting abutment 5 (step S32). The case 11 then rests at a stopped position with the pivoting abutment 5 holding the case 11 in place (step S33). While the case 11 is held in the holding position by the pivoting abutment 5, a second case is transported via the conveyor mechanism 15 until it reaches the outfeed rail 1 (step S34). The forwardly force applied to the second case by the conveyor mechanism 15 via the spacer trailing the second case is translated by the second case to the case 11 to displace the case 11 from the stopped position by forcing pivoting abutment assembly 5 to pivot and release the case 11 from the stopped position (step S35). The case 11 then travels along guide rail 2 and exits the outfeed rail (step S36). The second case then moves along the rollers 3, and the momentum of the second case is stopped by the pivoting abutment assembly 5 (step S37). The second case then rests at a stopped position, with the pivoting abutment assembly 5 holding the second case in the stopped position until another case causes the second case to be displaced to the next stage. This method may be repeated as many times and with as many cases as necessary.

The improved outfeed rail of the present invention may be positioned at any point along a production line where controlling the speed and/or orientation is important during the manufacturing or packaging process. The size and strength of the outfeed rail may be adjusted to accommodate a variety of articles of varying sizes and weights.

In describing exemplary embodiments, specific terminology is employed for the sake of clarity in this disclosure. However, the disclosure of this patent specification is not intended to be limited to the specific terminology so selected and it is to be understood that each specific element includes all technical equivalents that operate in a similar manner.

In addition, the above specific embodiments are illustrative, and many variations can be introduced on these embodiments without departing from the spirit of the disclosure or from the scope of the appended claims. For example, elements and/or features of different illustrative embodiments may be combined with each other and/or substituted for each other within the scope of this disclosure and appended claims.

What is claimed is:

1. An outfeed rail assembly as an interface between a first area of a production line and a second area of a production line, said outfeed rail assembly comprising:
    a rail arm; and
    a pivoting abutment assembly including
        a support arm attached to said rail arm, and
        a pivoting abutment arm pivotally attached to said support arm; and
    a roller attached to said pivoting abutment arm,
    wherein said roller rotates about a vertical axis, and
    wherein the pivoting abutment arm pivots in a direction horizontal to the direction of the rail arm.

2. The outfeed rail assembly of claim 1, wherein the pivoting abutment assembly further comprises a spring mechanism.

3. The outfeed rail assembly of claim 2, wherein the spring applies a spring force to the pivoting abutment arm such that the pivoting abutment arm holds a first article in place in a stopped position when the only farce propelling the article along the outfeed rail is a momentum of the article and the article comes into contact with the pivoting abutment arm, and the pivoting abutment arm pivots to a release position when a counter force greater than the spring force is applied to the pivoting abutment arm triggered by the article driven by a second article propelled by a conveying mechanism.

4. The outfeed rail assembly of claim 2, wherein said spring mechanism compresses and decompresses in a direction perpendicular to the direction of the rail arm.

5. The outfeed rail assembly of claim 1, wherein the pivoting abutment stops a momentum of an article as the article travels along the outfeed rail, and holds the article in a stopped position.

6. The outfeed rail assembly of claim 5, wherein the pivoting abutment releases the article when a force greater than the momentum of the article is applied to the article in a forwardly direction which translates to a corresponding tangential force against the pivoting abutment, to cause the pivoting abutment to pivot from a holding position to a release position.

7. The outfeed rail assembly of claim 1, wherein said roller includes an inner race and an outer race rotatably secured together by a bearing.

8. The outfeed rail assembly of claim 1, further comprising a guide rail attached to said rail arm.

9. The outfeed rail assembly of claim 1, further comprising at least one roller attached to said rail arm.

10. The outfeed rail assembly of claim 9, wherein said at least one roller allows an article sliding onto the outfeed rail to maintain its momentum until the article abuts the pivoting abutment.

11. The outfeed rail assembly of claim 1 wherein the outfeed rail assembly accommodates packaging for optical discs.

12. The outfeed rail assembly of claim 1, wherein the rail arm is L-shaped.

13. The outfeed rail assembly of claim 1, wherein when the pivoting abutment arm is held in a holding position, the roller is positioned at such an angle that it does not allow rotation thereof; and
    wherein when a sufficient tangential force is applied against the roller, the roller transfers the tangential force to the pivoting abutment arm and is positioned at such an angle that it allows for rotational movement.

14. An outfeed rail assembly as an interface between a first area of a production line and a second area of a production line, said outfeed rail assembly comprising:
    a rail arm;
    a support arm attached to said rail arm; and
    a spring-loaded lever pivotally attached to said support arm
    a roller attached to said spring-loaded lever, wherein said roller rotates about a vertical axis, and wherein the spring-loaded lever pivots in a direction horizontal to the direction of the rail arm.

15. The outfeed rail assembly of claim 14, wherein the spring-loaded lever holds a firm article in place in a stopped position when the only force propelling the first article along the outfeed rail is a momentum of the first article and the first article comes into contact with the spring-loaded lever, and the spring-loaded lever pivots to a release position when a counter force greater than the spring force is applied to the spring-loaded lever triggered by the first article driven by a second article propelled by a conveying mechanism.

16. The outfeed rail assembly of claim 14, wherein the spring-loaded lever stops a momentum of an article as the article travels along the outfeed rail, and holds the article in a stopped position.

17. The outfeed rail assembly of claim 16, wherein the spring-loaded lever releases the article when a force greater than the momentum of the article is applied to the article in a forwardly direction which translates to a corresponding tangential force against the spring-loaded lever, to cause the spring-loaded lever to pivot from a holding position to a release position.

18. The outfeed rail assembly of claim 14, wherein the spring-loaded lever comprises a spring that compresses and decompresses in a direction perpendicular to the direction of the rail arm.

* * * * *